United States Patent [19]
DiGiovanniantonio et al.

[11] Patent Number: 4,566,658
[45] Date of Patent: Jan. 28, 1986

[54] AIRCRAFT BARRICADE

[75] Inventors: Perry R. DiGiovanniantonio, Philadelphia; William J. Zimmer, Morton, both of Pa.

[73] Assignee: The United States of America as represented by the Secretary of the Navy, Washington, D.C.

[21] Appl. No.: 519,421

[22] Filed: Aug. 1, 1983

[51] Int. Cl.$^4$ .............................................. B64F 1/02
[52] U.S. Cl. ............................. 244/110 R; 244/110 C
[58] Field of Search ............ 244/110 R, 110 C; 43/7; 404/6; 256/13.1

[56] References Cited

U.S. PATENT DOCUMENTS

| | | |
|---|---|---|
| 2,872,136 | 2/1959 | Cotton et al. .................... 244/110 C |
| 3,069,118 | 12/1962 | Bernard . |
| 3,454,244 | 7/1969 | Walander . |
| 3,468,500 | 9/1969 | Carlson . |
| 3,513,231 | 5/1970 | Bair et al. . |
| 3,559,697 | 2/1971 | Whalen . |
| 3,622,107 | 11/1971 | Bernard . |
| 3,738,599 | 6/1973 | Borehag .......................... 244/110 C |
| 3,810,595 | 5/1974 | Doolittle . |
| 3,897,920 | 8/1975 | DiGiovanniantonio ........ 244/110 C |
| 3,938,763 | 2/1976 | DiGiovanniantonio ........ 244/110 C |

Primary Examiner—Galen L. Barefoot
Assistant Examiner—Rodney Corl
Attorney, Agent, or Firm—Robert F. Beers; Henry Hansen; Armand M. Vozzo, Jr.

[57] ABSTRACT

A webbing system is disclosed for use as an aircraft barricade wherein a plurality of rectangularly-shaped engaging loops are arranged in an alternating, multi-planar array and suspended across a landing area in the path of an approaching aircraft upon an assembly of support loops stretched between a pair of stanchions and connected on either side to an energy absorbing device. Slidably connected along upper and lower horizontal components of the support loops, the engaging loops are free to move laterally along the support loops toward the longitudinal axis of the aircraft when penetrated by the fuselage so that the aircraft is ensnared about its wings by the loops with equalized loading and its forward motion arrested.

12 Claims, 5 Drawing Figures

AIRCRAFT BARRICADE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of aeronautics and more particularly to webbing systems for arresting the forward motion of a landing aircraft.

Aircraft barricades are normally used as emergency devices for arresting the forward motion of a landing aircraft in a limited amount of space. Such barricades, employed on both aircraft carrier decks and land runways, typically consist of expendable webbing assemblies fabricated of interconnected nylon straps which are stretched across the path of the incoming aircraft in various configurations and attached at either end to any energy absorbing device. These straps, sometimes referred to as webbing, generally comprise the barricade vertical members which serve to engage the leading edge of the aircraft wings thereby absorbing the force of the aircraft's forward motion. Preferably these vertical strap members have been movable laterally upon wing engagement to distribute loading along the wings as equally as possible.

Modern high-performance aircraft having their wings disposed at relatively large sweep-back angles have presented difficult problems to the effectiveness of such existing webbing barricades. Due to the substantial swept-back nature of the aircraft wings, the movable vertical strap members of the aforedescribed webbing barricades have been caused to slide outward along the wings immediately upon impact frequently resulting in complete disengagement of the aircraft. While other existing aircraft barricades having webbing loops for fuselage engagement may avoid the arrestment problems caused by the swept-back wings, such fuselage-engaging barricades have not been completely satisfactory in applying safe and equalized arresting loads to the aircraft.

SUMMARY OF THE INVENTION

Accordingly, it is a main purpose and general object of the present invention to provide an improved barricade system for arresting the forward motion of a winged aircraft in landing.

It is a more particular object of the present invention to provide an aircraft barricade that effectively arrests modern high-performance aircraft having their wings disposed at substantial sweep-back angles.

A further object of the present invention is to provide an emergency barricade system for swept-back wing aircraft that positively engages the wings of the landing aircraft with equalized loading thereon so that safe and reliable arrestment is effected in a limited amount of space.

A still further object of the present invention is to provide an aircraft barricade that is simple yet reliable in performance, relatively inexpensive to fabricate, and easily installed upon existing landing surfaces on both carrier decks and land runways.

Briefly, these and other objects of the present invention are accomplished by a webbing system for use as an aircraft barricade wherein a plurality of rectangularly-shaped engaging loops are arranged in an alternating series and suspended across a landing area in the path of an approaching aircraft upon an assembly of support loops stretched between a pair of stanchions and connected on either side to an energy absorbing device. Slidably connected along upper and lower horizontal components of the support loops, the engaging loops are free to move laterally along the support loops toward the longitudinal axis of the aircraft when penetrated by the fuselage so that the aircraft is ensnared about its wings by the loops with equalized loading and its forward motion arrested.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figure 1:
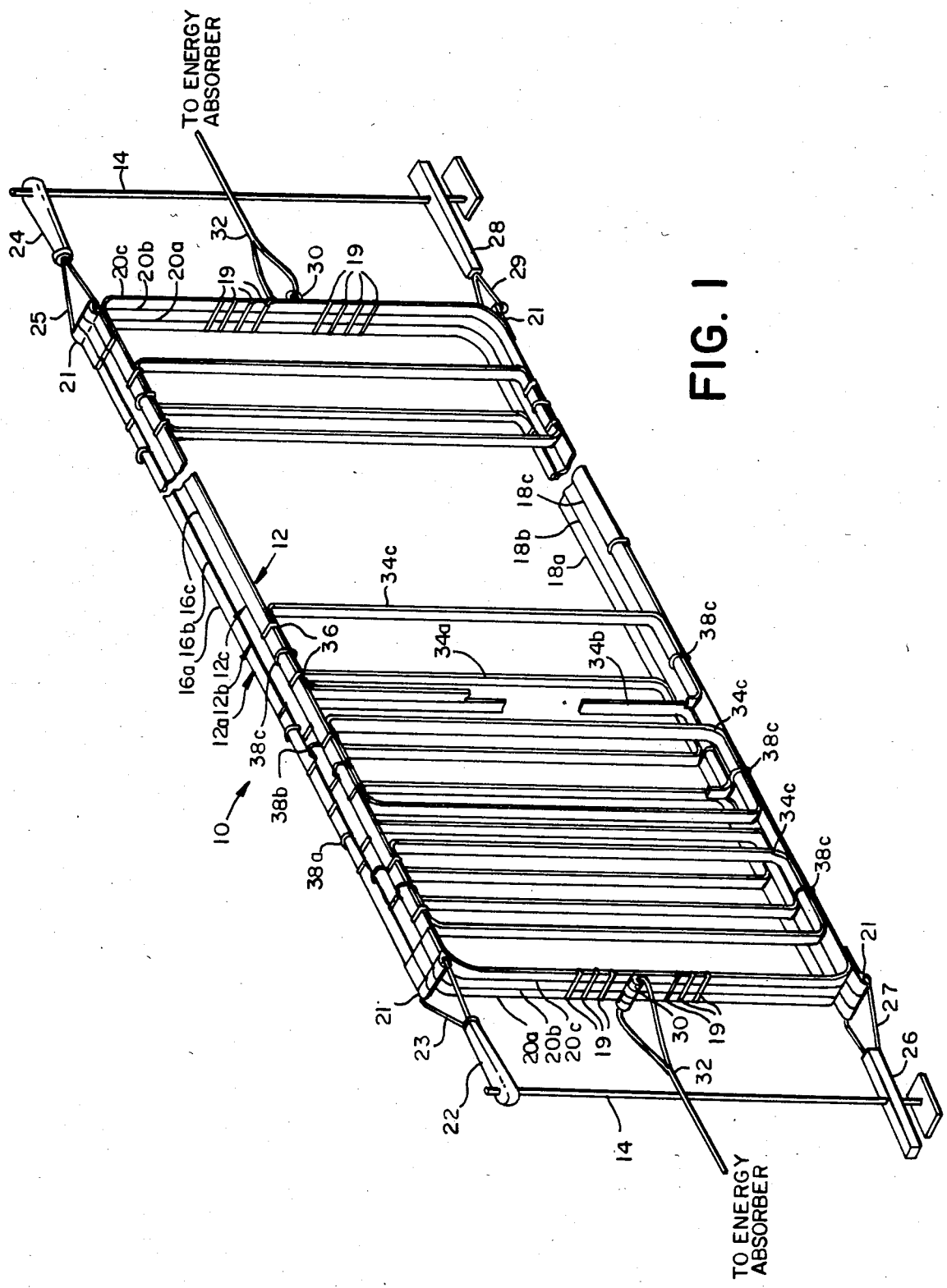
FIG. 1 is a partially broken, perspective view of the webbing system according to the present invention shown in a raised, operative position prior to engagement by an aircraft.

Referring now to FIG. 1, the webbing system of the present invention, generally designated 10, is shown in a raised and assembled state for use as an aircraft barricade. The webbing system 10 includes a support loop assembly 12 composed of a plurality, typically at least three in number as shown, of continuous support loops 12a, 12b and 12c, each fabricated from a high strength, flexible material, such as nylon strap or webbing. Configured substantially in the shape of a rectangle extending laterally across the path of an approaching aircraft, the support loop assembly 12 is stretched between a pair of stanchions 14 and connected to energy absorbing devices on either of its sides, as described in greater detail hereinafter.

Each of the support loops 12a, 12b and 12c is constructed of separate sets of upper and lower horizontal components 16a, 16b and 16c and 18a, 18b and 18c, respectively, shown broken along their lengths. Each respective set of upper and lower horizontal components 16a-c and 18a-c is interconnected at their ends in some appropriate manner, such as by sewing, using similarly fabricated vertical side components 20a, 20b and 20c to provide a continuous, closed construction to each of the support loops 12a-c. Fastened together edge-to-edge by a series of strap clips 19 wrapped about the vertical side components 20a-c the support loops 12a-c are juxtaposed in substantially parallel planes stretching across the aircraft path between stanchions 14. Loop connectors 21 are secured across the ends of upper and lower horizontal components 16a-c and 18a-c on the side of the support loop assembly 12 and are coupled to stanchions 14 via strap mounts 22, 24, 26 and 28 and respective release straps 23, 25, 27 and 29 for applying tension to the upper and lower horizontal components thereby maintaining the support loops 12a, 12b and 12c in their stretched, juxtaposed arrangement prior to aircraft engagement. The release straps 23, 25, 27 and 29 are routed through loop connectors 21 and affixed to the respective strap mounts 22, 24, 26 and 28 fastened at the top and bottom of both stanchions 14, the strap mounts typically being adjustable to permit the upper and lower horizontal components to be tensioned equally. The release straps 23, 25, 27 and 29 are designed to break away from the respective strap mounts 22, 24, 26 and 28 and thus from stanchions 14 at some predetermined, relatively nominal force in excess of that typically used to tension the upper and lower horizontal components 16a–c and 18a–c, respectively.

Support loop assembly 12 is connected to conventional energy absorbing devices (not shown) on either side of the aircraft path to provide restraint forces capable of arresting a landing aircraft. A pair of loop connectors 30, typically fabricated of nylon webbing, are attached across respective sets of vertical side components 20a–c at approximately the middle of their lengths. Adapted to be routed through the loop connectors 30 on both sets of vertical side components 20a–c, respective connecting cables 32 having very high tensile strength are made to engage the energy absorbing devices on either side of the support loop assembly 12 to apply the appropriate restraint forces thereto.

A plurality of rectangularly formed loops 34a, 34b and 34c, similar in height but considerably smaller in width than support loops 12a–c, are arranged in a multi-planar array within the support loop assembly 12 for engaging an incoming aircraft. Fabricated from a strong webbing material similar to that used in support loops 12a–c, the engaging loops 34a–c are disposed within the support loop assembly 12 in distinct transverse rows and are slidably connected, as described in detail hereinbelow, between corresponding upper and lower horizontal components 16a–c and 18a–c, each row being substantially located within a respective parallel plane of the juxtaposed support loops. The individual engaging loops 34a–c within each transverse row are situated side-by-side across the respective support loops 12a–c, each transverse row being positioned within its support loop so that the engaging loops of alternate rows, such as 34a and 34c, are substantially aligned with each other from front to back of the support loop assembly 12. The engaging loops 34a–c within adjacent transverse rows, such as 34a and 34b, are thus laterally separated by a distance approximately one-half the width of each engaging loop to provide the alternating, multi-planar array.

Figure 2:
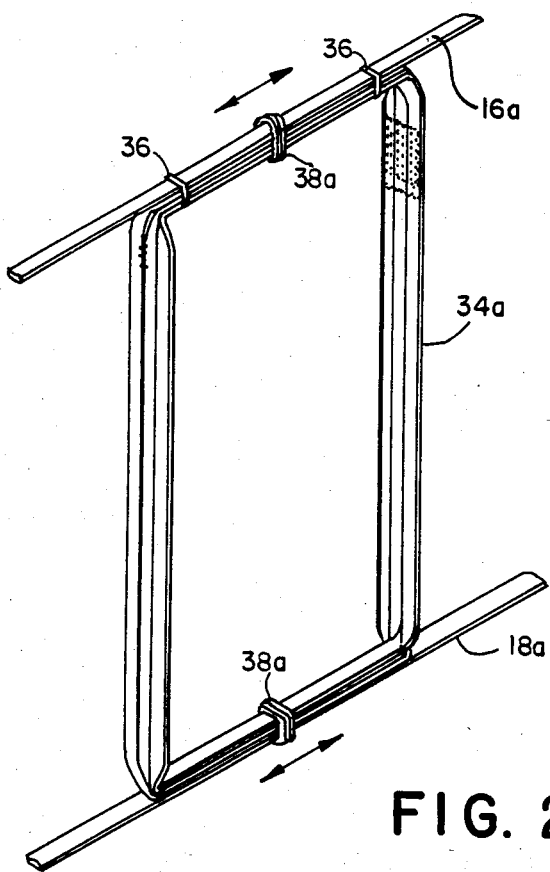
FIG. 2 is a perspective view showing one engaging loop incorporated in the webbing system of FIG. 1.

Referring now to FIG. 2 in conjunction with FIG. 1, the engaging loops 34a–c are typically fabricated from several layers of the webbing material stacked together along the top of the loop and sewn edge-to-edge along the sides to provide reinforcement for effectively handling the substantial impact loads of the aircraft. Each engaging loop 34a–c is held in proper position within its associated support loop 12a–c using at least a pair of fastener strips 36, typically pieces of friction tape, wrapped around the top of the engaging loop and the associated upper horizontal component 16a–c adjacent thereto. Secured along the top of the individual engaging loops 34a–c near each of its side, the fastener strips 36, releasable upon the impact force of the incoming aircraft, maintain the individual engaging loops, prior to impact, in close proximity to the associated upper horizontal components 16a–c permitting the sides of each engaging loop to drape into the proper rectangular configuration. It should be noted that the rectangular configuration thus provided the engaging loops 34a–c, wherein each loop completely encompasses the elevated distance between the respective upper and lower horizontal components 16a–c and 18a–c, is particularly advantageous in ensnaring and arresting a "porpoising" aircraft the nose of which is moving up and down along the runway or deck after touchdown.

Each one of the multi-planar array of rectangular engaging loops 34a–c is further coupled within its associated support loop 12a–c to permit sliding of the engaging loop from side-to-side along the respective upper and lower horizontal components 16a–c and 18a–c. Slidable fittings 38a–c, such as D-rings, are installed in pairs upon each engaging loop 34a–c, one fitting along the top of the loop and other along the bottom, and each fitting is adapted for routing therethrough by the respective upper and lower horizontal components 16a–c and 18a–c. As a result, any individual engaging loop 34a–c penetrated by the aircraft and released of fastener strips 36 is free to shift in either lateral direction along the associated horizontal components 16a–c and 18a–c, thereby allowing the penetrated engaging loop to effectively center itself substantially along the longitudinal axis A of the incoming aircraft 40, better shown and described below in reference to FIGS. 3 and 4, and thus apply equalized loading in arresting the aircraft.

It should be noted that the strap or webbing material of the support loop assembly 12, particularly those of the upper and lower horizontal components 16a–c and 18a–c, respectively, may be coated with a thin layer of polyurethane to increase abrasion resistance and prevent tearing and shredding during arrestment. In addition, the webbing material of the engaging loops 34a–c may be provided with U-shaped polyurethane-coated nylon edging, as described in U.S. Pat. Nos. 3,897,920 and 3,938,763, to virtually eliminate the risk of cutting, tearing, or shredding of the webbing material.

Figure 3:
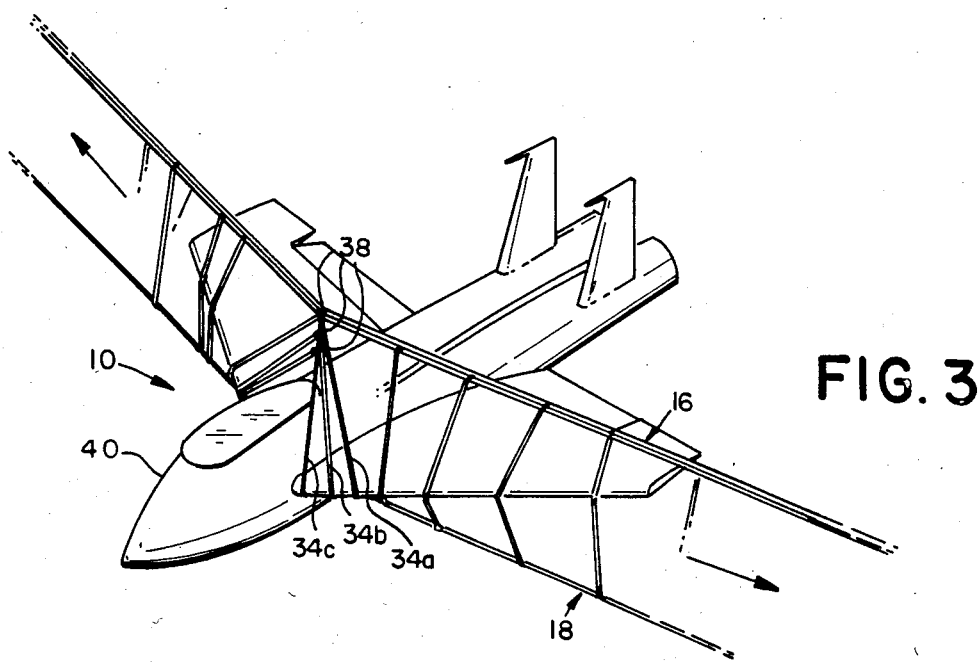
FIG. 3 is a schematic illustration in perspective of an aircraft being ensnared by the webbing system shown in FIGS. 1 and 2.
Figure 4A:
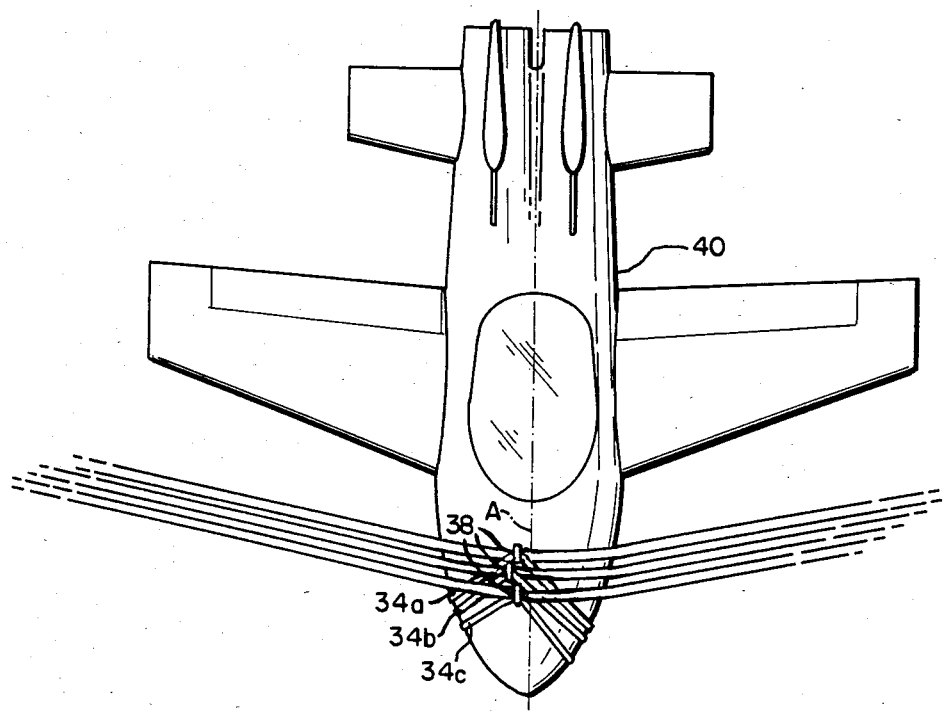
FIGS. 4a and 4b represent plan views of the arrestment of an aircraft by the webbing system of the present invention showing its operation.

Referring now to FIGS. 3 and 4 in conjunction with FIGS. 1 and 2, the operation of the webbing system 10 as an aircraft barricade can best be explained. Prior to aircraft approach, the webbing system 10 is erected and stretched between stanchions 14 across the projected landing path of incoming aircraft 40 so that the alternating, multi-planar array of rectangular engaging loops 34a–c is suspended substantially normal to the projected path. With the webbing system 10 in this erected and stretched state, the rectangular support loop assembly 12 is tensioned at its corners along the upper and lower horizontal components 16a–c and 18a–c, and coupled at each set of its side components 20a–c to energy absorbing devices.

Figure 4B:
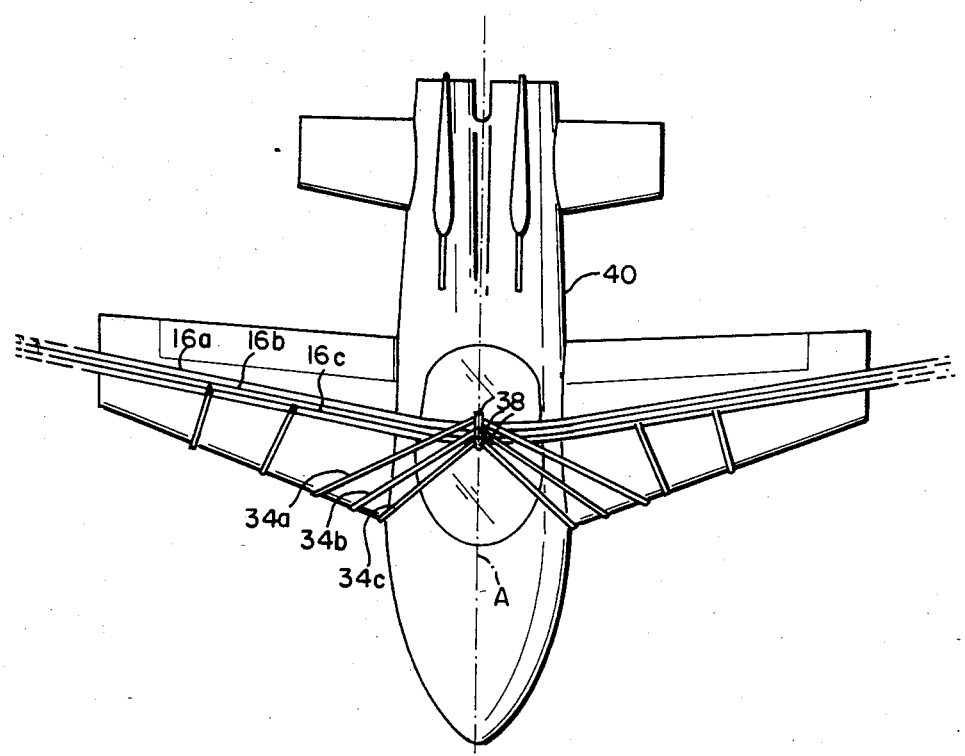

Upon impact of the incoming aircraft 40 with webbing system 10, the nose and fuselage of the aircraft penetrates a series of aligned rectangular engaging loops 34a–c, typically one such engaging loop within each support loop 12a–c, breaking the penetrated engaging loops free from fastener strips 36. As best viewed in FIG. 4a, the penetrated engaging loops 34a–c, though released from their set rectangular configuration within the support loops 12a–c, remain slidingly connected to the support loops along its upper and lower horizontal components 16a–c and 18a–c via fittings 38. Thus permitted to move laterally along the horizontal components 16a–c and 18a–c, the penetrated engaing loops 34a-c shift accordingly, as the aircraft 40 continues forward, toward the longitudinal axis A of the aircraft from any offset position that may have existed at the time of initial penetration, as indicated by the position of fittings 38 in FIG. 4a, to a final position substantially centered along the longitudinal axis, as indicated in FIG. 4b. In such a centered engagement position, the engaging loops 34a-c, so penetrated by the aircraft fuselage, ensnare aircraft 40 about its wings with equalized loading thereon, and the forward motion of the aircraft is arrested via restraint forces transmitted along the various support loops 12a-c to the energy absorbing devices on either side. It should be understood that those engaging loops 34a-c not penetrated by the aircraft fuselage are typically swept aside, as indicated in FIG. 3, along the wings of the aircraft so as not to interfere with the aircraft arrestment.

Therefore, it is apparent that the disclosed invention provides an improved barricade system for arresting the forward motion of a winged aircraft, particularly those modern high-performance aircraft having their wings disposed at substantial sweep-back angles. The disclosed webbing system provides an emergency aircraft barricade that positively engages the landing aircraft with equalized loading on its wings so that safe and reliable arrestment is effected in a limited amount of space. In addition, the disclosed webbing system provides an aircraft barricade that is simple yet reliable in performance, relatively inexpensive to fabricate, and easily installed upon existing landing surfaces on both carrier decks and land runways.

Obviously, other embodiments and modifications of the present invention will readily come to those of ordinary skill in the art having the benefit of the teachings presented in the foregoing description and drawings. For example, alternate means, rather than fittings 38a-c, may be employed to slidingly connect the engaging loops 34a-c to respective ones of the support loops 12a-c. In particular, a loop connector, similar to that of connector 30, made of strong, heat-resistant webbing material may be installed about the top and bottom of the engaging loops and the respective upper and lower horizontal components 16a-c and 18a-c to permit lateral movement of the engaging loops along the support loops 12a-c when penetrated by the aircraft fuselage. It is therefore to be understood that various changes in the details, materials, steps and arrangement of parts, which have been described and illustrated to explain the nature of the invention, may be made by those skilled in the art within the principle and scope of the invention as expressed in the appended claims.

What is claimed is:

1. A webbing system for arresting the forward motion of a landing aircraft comprising:
   a plurality of first rectangular loops juxtaposed in substantially parallel planes and adapted to be extended substantially vertically across the path of the aircraft; and
   a plurality of second rectangular loops arranged within said first rectangular loops in alternating transverse rows substantially coplanar with the respective planes of said first loops, said second loops being slidably connected to respective ones of said first loops to permit a lateral movement along the entire length thereof and equalize loading on the aircraft's wings, said second loops furthermore positioned side-by-side in the transverse rows, those in alternate rows being substantially aligned with each other and those in adjacent rows being laterally offset from each other by approximately one-half the width of said loops.

2. A webbing system according to claim 1, wherein:
   said second loops are formed to coextend with the vertical elevation of said first loops.

3. A webbing system according to claim 2, wherein:
   each of said first and second loops comprises a relatively strong, flexible webbing material.

4. A webbing system according to claim 3, wherein said webbing material comprises nylon.

5. A webbing system according to claim 4, wherein:
   said first loops are coated with a relatively thin layer of polyurethane to increase abrasion resistance and prevent tearing; and
   said second loops are edged with a U-shaped polyurethane-coated nylon material.

6. An aircraft barricade, comprising:
   a plurality of first rectangular loops juxtaposed in substantially parallel planes;
   support means releasably connected to said first rectangular loops for extending said first loops substantially vertically across a projected path of an incoming aircraft;
   energy absorber means connected to said first rectangular loops for applying substantially horizontal restraint forces to said loops; and
   a plurality of second rectangular loops arranged within said first rectangular loops in an alternating multi-planar array, said second loops being substantially disposed within respective planes of said first loops and slidably connected thereto to permit lateral movement along the entire width thereof and equalize loading on the aircraft wings, said second loops furthermore positioned side-by-side, alternated in transverse rows substantially coplanar with the respective planes of said first loops, substantially aligned with each other in alternate transverse rows, and laterally offset from each other in adjacent transverse rows by approximately one-half the width of said loops.

7. An aircraft barricade according to claim 6, wherein:
   said second loops are formed to coextend with the vertical elevation of said first loops.

8. An aircraft barricade according to claim 7, wherein said energy absorber means comprises:
   a pair of energy absorbers located on either side of the projected path of the incoming aircraft; and
   lengths of cable engaging said energy absorbers and connected to the respective sides of said first loops near the middle thereof.

9. An aircraft barricade according to claim 7, wherein said support means comprises:
   a pair of stanchions located on either side of the projected path of the incoming aircraft;
   releasable strap members connected to the four corners of said first loops and mounted upon said stanchions to apply tension along the upper and lower horizontal components of said first loops; and
   adjustable means for mounting said strap members upon said stanchions.

10. An aircraft barricade according to claim 7, wherein:
    each of said first and second loops comprise a relatively strong, flexible webbing material.

11. An aircraft barricade according to claim 10, wherein said webbing material comprises nylon.

12. An aircraft barricade according to claim 11, wherein:

said first loops are coated with a relatively thin layer of polyurethane to increase abrasion resistance and prevent tearing; and said second loops are edged with a U-shaped polyurethane-coated nylon material.

* * * * *